(12) United States Patent
Norris et al.

(10) Patent No.: US 9,155,108 B2
(45) Date of Patent: Oct. 6, 2015

(54) TRANSMITTING INFORMATION TO A RADIO ACCESS NETWORK BASED ON DEFAULT REPORTING

(75) Inventors: Tim J. Norris, Winchester (GB); Graham A. Charles, Fleet (GB)

(73) Assignee: NOKIA TECHNOLOGIES OY, Espoo (FI)

( * ) Notice: Subject to any disclaimer, the term of this patent is extended or adjusted under 35 U.S.C. 154(b) by 1161 days.

(21) Appl. No.: 11/808,903

(22) Filed: Jun. 13, 2007

(65) Prior Publication Data
US 2008/0045213 A1 Feb. 21, 2008

(30) Foreign Application Priority Data

Jun. 13, 2006 (GB) .................................. 0611684.2

(51) Int. Cl.
*H04W 4/00* (2009.01)
*H04W 74/00* (2009.01)
*H04W 24/10* (2009.01)
*H04W 74/08* (2009.01)

(52) U.S. Cl.
CPC ........ *H04W 74/008* (2013.01); *H04W 74/0866* (2013.01); *H04W 24/10* (2013.01); *H04W 74/0833* (2013.01)

(58) Field of Classification Search
CPC .................................................... H04W 80/04
USPC ......... 370/235, 231, 242, 244, 328, 329, 338, 370/348, 349; 455/435.1, 450–451, 452.2, 455/452.1, 455
See application file for complete search history.

(56) References Cited

U.S. PATENT DOCUMENTS

| 2005/0250504 A1* | 11/2005 | Mikola .......................... 455/450 |
| 2008/0056198 A1* | 3/2008 | Charpentier et al. ......... 370/332 |
| 2008/0076359 A1* | 3/2008 | Charpentier et al. ........ 455/63.1 |
| 2009/0252139 A1* | 10/2009 | Ludovico et al. ............. 370/342 |

FOREIGN PATENT DOCUMENTS

| WO | WO 02/078383 A1 | 10/2002 |
| WO | WO03007508 A1 | 1/2003 |
| WO | WO 2006034818 A1 * | 4/2006 ............. H04L 12/56 |
| WO | WO2006034819 A1 | 4/2006 |

OTHER PUBLICATIONS

ETSI TS 125 331 V3.21.0, *Universal Mobile Telecommunications System (UMTS); Radio Resource Control (RRC) Protocol Specification* (3GPP TS 25.331 Version 3.21. Release 1999), Dec. 2004, pp. 1-880.

International Search Report PCT/IB2007/001611 filed Jun. 6, 2007.
(Continued)

*Primary Examiner* — Christopher R Crompton
(74) *Attorney, Agent, or Firm* — Squire Patton Boggs (US) LLP

(57) ABSTRACT

In a communications system a message is sent from a mobile terminal to a radio access network on a common transport channel, the message comprising information associated with one or more access entities of the radio access network. The information which is sent to the radio access network is based on a default reporting configuration stored in the mobile terminal.

23 Claims, 3 Drawing Sheets

(56) References Cited

OTHER PUBLICATIONS

Universal Mobile Telecommunications System (UMTS); Radio Resource Control (RRC) Protocol Specification, 3GPP TS 25.331 version 4.2.1, Release 4.

Office Action dated Aug. 14, 2010 cited in corresponding Korean Patent Application No. 10-2008-7031766, including English translation.
Office Action dated Jan. 23, 2014, issued in corresponding Indian Patent Application No. 6727/CHENP/2008.
Japanese Examination Report dated Jun. 14, 2011.

* cited by examiner

TRANSMITTING INFORMATION TO A RADIO ACCESS NETWORK BASED ON DEFAULT REPORTING

FIELD OF THE INVENTION

The present invention relates to the field of telecommunications systems, and in particular to reporting information associated with access entities from a mobile terminal to a radio access network, especially during the establishment of uplink connections.

BACKGROUND

A communication system can be seen as a facility that enables communication sessions between two or more entities such as user equipment and/or other nodes associated with the communication system. The communication may comprise, for example, communication of voice, data, multimedia and so on.

Communication systems providing wireless communication for user equipment are known. A cellular telecommunications system is a communication system that is based on use of radio access entities and/or wireless service areas. The access entities are typically referred to as cells. Examples of cellular telecommunications systems include standards such as the GSM (Global System for Mobile communications) or various GSM based systems (such as GPRS: General Packet Radio Service), AMPS (American Mobile Phone System), DAMPS (Digital AMPS), WCDMA (Wideband Code Division Multiple Access), TDMA/CDMA (Time Division Multiple Access/Code Division Multiple Access) in UMTS (Universal Mobile Telecommunications System), CDMA 2000, i-Phone and so on.

In a cellular system, a base transceiver station (BTS) provides a wireless communication facility that serves mobile stations (MS) or similar wireless user equipment (UE) via an air or radio interface within the coverage area of the cell. As the approximate size and the shape of the cell is known, it is possible to associate the cell to a geographical area. Each of the cells can be controlled by an appropriate controller apparatus.

Cellular systems typically support communication with user equipment changing locations (mobile users). The support for communications for mobile users may include support for handing existing connections from one cell to another cell. At least routing of calls or communications for a mobile user in a new cell is typically supported in cellular systems.

In a radio access network (RAN) based on a cellular system, communication takes place from the network to a mobile terminal or user equipment (UE) in downlink, and from the UE to the network in the up-link.

In certain communication systems, two types of transport channels—dedicated channels and common channels—may be provided. A common channel is a resource divided between all or a group of users in a cell, whereas a dedicated channel is by definition reserved for a single user.

An example of a common channel in a typical system is a random access channel (RACH). The RACH is mapped onto the Physical Random Access Channel (PRACH). It carries uplink common control information, i.e. Common Control Channel (CCCH), such as requests to set up radio resource control (RRC) connections. It may further carry dedicated control information, i.e. the Dedicated Control Channel (DCCH), between the UE and the network, established through the RRC connection setup procedure. The RACH is further used for sending dedicated user information, i.e. the Dedicated Traffic Channel (DTCH), such as small amounts of uplink packet data.

Thus during a RRC connection setup procedure, the RACH may be used by the mobile terminal in order to initiate access to the RAN. However, before the mobile terminal can send an RRC connection setup request to the RAN, it is typically required that the mobile terminal must have received and processed certain system information broadcast from the RAN. The system information is usually broadcast in blocks, each block grouping together system information elements of the same nature.

The system information may include a definition of what types of information the RAN requires from the mobile terminal in order to initiate a connection. In a cellular system, this information may relate, for example, to the relationship between the mobile terminal and different access entities of the communication system.

The information may enable the RAN to select the most appropriate access entity to serve the mobile terminal, to calculate the initial downlink power when transmitting to the mobile terminal and/or to select the active set when moving the terminal equipment into a different control state. For instance in a 3G WCDMA packet data mobile network, the terminal may be in one of a number of radio resource control states such as CELL_DCH (in which the terminal has a dedicated channel to the access network), CELL_FACH (Forward Access Channel, in which the terminal is tracked at cell level but shares an access channel with other terminals) and CELL_PCH (Paging Channel, in which the terminal is tracked at cell level and needs to be paged and shifted to a higher power control state before sending or receiving packet data). The cell reporting information may be required by the RAN in order to select the appropriate settings when shifting the mobile terminal to the active CELL_DCH state.

Thus the system may define that the mobile terminal needs to report the results of particular measurements to the RAN, the measurements relating to properties associated with signal transmission between the mobile terminal and the various access entities. After receiving the system information, the mobile terminal may send the required data (such as measurement results) to the RAN in a connection request message, according to the required reporting configuration specified in the system information.

A problem associated with this method is that the requirement for the mobile terminal to read certain system information before sending a connection request message can introduce a significant delay into the setup procedure, during which time the mobile terminal is unable to contact the RAN. A similar problem arises when the mobile terminal needs to send other types of message to the RAN (such as a measurement report message, a location update (e.g. cell update) or core network message) on a common transport channel such as RACH, before a dedicated physical channel between the mobile terminal and the RAN has been established.

One potential approach to solving this problem would be to allow the mobile terminal to send a connection request message or other message type on the common transport channel before it has read the system information. However, in this case it is not apparent how the required cell information should be provided from the mobile terminal to the RAN.

SUMMARY

Embodiments of the present invention aim to address one or more of the above-referenced problems. In particular, the present invention aims to provide an improved method for reporting information associated with access entities from a mobile terminal to a RAN on a common transport channel, e.g. during a connection initiation procedure.

Accordingly, one embodiment provides a method in a communications system, comprising a step of sending a message from a mobile terminal to a radio access network on a common transport channel, wherein the message comprises information associated with one or more access entities of the radio access network, and the information which is sent to the radio access network is based on a default reporting configuration stored in the mobile terminal.

Another embodiment provides a mobile terminal configured to send a message to a radio access network on a common transport channel, wherein the message comprises information associated with one or more access entities of the radio access network, and the mobile terminal is configured to send the information to the radio access network based on a default reporting configuration stored in the mobile terminal.

Another embodiment provides a node in a radio access network, the node being configured to receive and process a message from a mobile terminal on a common access channel, wherein the message comprises information associated with one or more access entities of the radio access network, the information being based on a default reporting configuration stored in the mobile terminal.

Another embodiment provides a communication system comprising a mobile terminal configured to send a message to a radio access network on a common transport channel, wherein the message comprises information associated with one or more access entities of the radio access network, the mobile terminal being configured to send the information to the radio access network based on a default reporting configuration stored in the mobile terminal; and a node in the radio access network configured to receive and process the message.

Another embodiment provides a computer program product comprising a set of instructions which when executed by a processor in a mobile terminal, causes the mobile terminal to send a message to a radio access network on a common transport channel, wherein the message comprises information associated with one or more access entities of the radio access network, the information being based on a default reporting configuration stored in the mobile terminal.

Another embodiment provides a mobile terminal comprising storage means for storing a default reporting configuration defining at least one type of information to be sent to a radio access network, the information being associated with one or more access entities of the radio access network; and transmission means for sending a message to the radio access network on a common transport channel, the message comprising information of the type defined in the default reporting configuration.

Another embodiment provides an integrated circuit for use in a mobile terminal, wherein the integrated circuit is adapted to cause the mobile terminal to send a message to a radio access network on a common access channel, the message comprising information associated with one or more access entities of the radio access network, the information being based on a default reporting configuration stored in the mobile terminal.

Preferably the message comprises a request for connection to the radio access network, a core network message, a measurement report message, or a location update (e.g. cell update) message. More preferably the message comprises an RRC Connection Request message, a Cell Update message, a Measurement Report or Initial Direct Transfer message. Most preferably the message is an RRC Connection Request message.

The mobile terminal typically sends the message before a dedicated physical transport channel has been established between the mobile terminal and the radio access network, e.g. while the mobile terminal is in an RRC control state other than CELL_DCH. For instance in one embodiment the message may be sent while the mobile terminal is in the CELL_FACH state.

Preferably the information sent by the mobile terminal in the message (e.g. in a connection request) comprises one or more measurement results, each measurement result defining a value of a measured parameter relating to radio signal transmission between the mobile terminal and an access entity. The measured parameter more preferably comprises Received Signal Code Power, a signal to interference ratio, or Observed Time Difference.

The measured parameter preferably relates to a first access entity serving the mobile terminal and/or one or more further access entities adjacent to the first access entity. Thus the information may comprise a first measured value of Received Signal Code Power relating to the serving access entity. In some embodiments the information further comprises a second measured value of Ec/No and a third measured value of SFN-SFN Observed time difference type 1, each of the second and third measured values relating to a further access entity adjacent to the first access entity.

The message (e.g. the connection request) is preferably sent before the mobile terminal reads a control message transmitted from the radio access network to the mobile terminal, the control message defining a required reporting configuration for reporting the information associated with one or more access entities from the mobile terminal to the radio access network. More preferably the mobile terminal sends the message before the mobile terminal receives the control message from the radio access network.

The control message preferably comprises a system information block type 11 message. In some embodiments the radio access network may send an indication to the mobile terminal before the mobile terminal sends the message (e.g. connection request), the indication defining that the mobile terminal can send the message (e.g. connection request) before the mobile terminal reads the control message.

Preferably the radio access network comprises a Universal Mobile Telecommunications System Terrestrial Radio Access Network (UTRAN). The common transport channel is preferably a Random Access Channel, i.e. the mobile terminal preferably sends the request using a RACH.

Embodiments of the present invention may advantageously provide an enhanced method for reporting cell-related information on a common transport channel, for instance on a RACH during a connection set-up procedure, prior to establishing a dedicated physical channel between a mobile terminal and a radio access network. Because a default configuration for reporting the access entity associated information is defined in the mobile terminal, the terminal does not have to wait until it has received and processed a definition of a required reporting configuration from the radio access network before the mobile terminal can send the message, e.g. before the mobile terminal can initiate an access request. This can reduce delays associated with the terminal receiving and reading the required reporting configuration, for instance as defined in a System Information Block Type 11 (SIB11) message, before it can send a connection request message, a cell update or other type of message on the common transport channel.

Reducing such delays can be advantageous in many situations, including where the mobile terminal wishes to connect to a new access network or roams into a different cell area and needs to connect to a new node. In addition, reporting cell results from a serving cell and neighbouring cells at the earliest possible stage enables the RAN to start a system handover as soon as possible, if the signal transmission properties in a particular cell are suitable for this. In addition, reporting of cell results for detected cells that have not been configured can be advantageous during network planning to identify neighbour cells that are not configured correctly.

BRIEF DESCRIPTION OF DRAWINGS

The invention will now be described by way of example only, with reference to the following specific embodiments, in which.

DESCRIPTION OF EXEMPLIFYING
EMBODIMENTS

Figure 1:
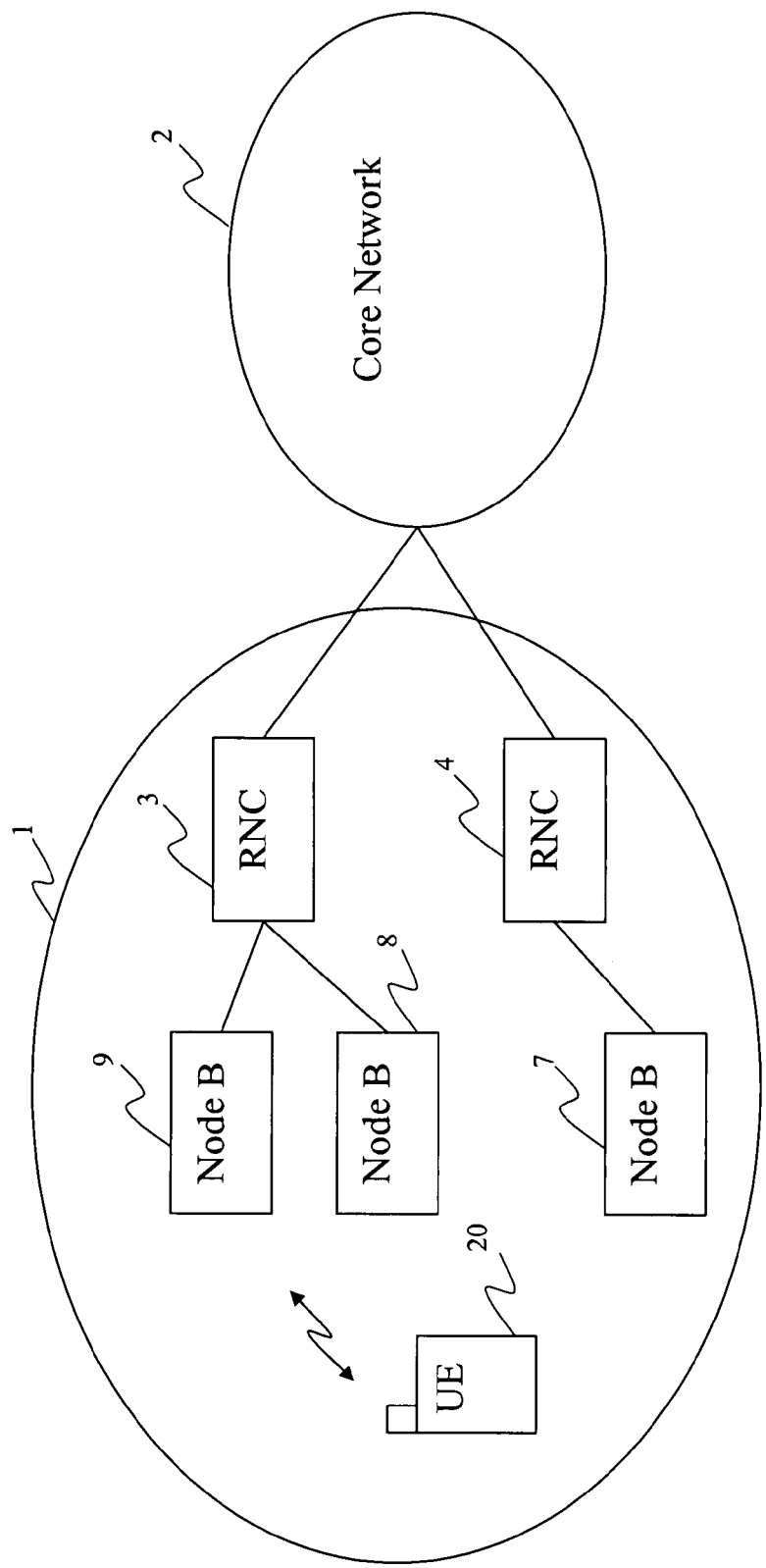
FIG. 1 shows a communication system comprising a UTRAN in which embodiments of the present invention may be implemented.

Referring to FIG. 1, there is illustrated schematically an example of a UMTS (Universal Mobile Telecommunication System) with respect to which embodiments of the present invention may be utilized.

In FIG. 1, the UMTS radio access network (RAN) 1 includes a plurality of Node B's, such as node B's 7, 8 and 9. Each Node B is connected to a radio network controller (RNC). Node B's 8 and 9 are connected to an RNC 3, and Node B 7 is connected to RNC 4. Each RNC is connected to a core network (CN) 2. The core network may further be connected to external networks, such as an ISDN network or a Packet Data network (not shown). Various mobile terminals are in the radio access network, as represented by user equipment (UE) 20.

Each Node B 7, 8 and 9 may be associated with a particular cell or geographical area within which that Node B serves mobile terminals. Thus each Node B may send and/or receive messages from mobile terminals within that cell. Cell areas may overlap such that a mobile terminal may be able to communicate with two or more Node B's simultaneously.

The UTRAN may comprise the Random Access Channel (RACH). The RACH is mapped onto the Physical Random Access Channel (PRACH). It carries uplink common control information, i.e. Common Control Channel (CCCH), such as requests to set up radio resource control (RRC) connections. It may further carry dedicated control information, i.e. the Dedicated Control Channel (DCCH), between the UE and the network, established through the RRC connection setup procedure. The RACH is further used for sending dedicated user information, i.e. the Dedicated Traffic Channel (DTCH), such as small amounts of uplink packet data.

The UTRAN 1 broadcasts various system information blocks to mobile terminals within its area. These information blocks are transmitted by Node Bs 7, 8 and 9 to mobile terminals located within their respective cells. User equipment 20 in FIG. 1 may be able to receive information blocks transmitted by one or more of Node Bs 7, 8 and 9. Various system information blocks which are transmitted from the UTRAN are shown in FIG. 2 (messages 21 to 25).

If the UE 20 wishes to use resources provided by the UTRAN 1, it initiates a RACH access by sending a Radio Resource Control (RRC) Connection Request message 30 to the UTRAN via a Node B. The message 30 may include information associated with one or more of the cells served by Node Bs 7, 8 and/or 9, which may be referred to as cell reporting information. In particular, the message 30 may include the results of measurements which may be used to determine power or other settings for communications between the user equipment and each of the Node Bs, or to characterize the suitability of particular cells for serving the user equipment. For instance the results may include parameters such as Received Signal Code Power, Ec/Io (a measure of signal to interference ratio) and Observed Time Difference relating to signal transmission between the user equipment and particular Node Bs/cells. The measurements may be made by the user equipment or by another node in the network (and then transmitted from the other node to the user equipment).

According to embodiments of the present invention, the cell reporting information which is sent in message 30 is based on a default reporting configuration which is stored in the user equipment. This means that the user equipment 20 can determine which types of information to send (i.e. whether to send Received Signal Power or Ec/Io measurement results for particular cells) towards the UTRAN in the RRC Connection Request, without being instructed by the UTRAN to send specific types of information.

Figure 2:
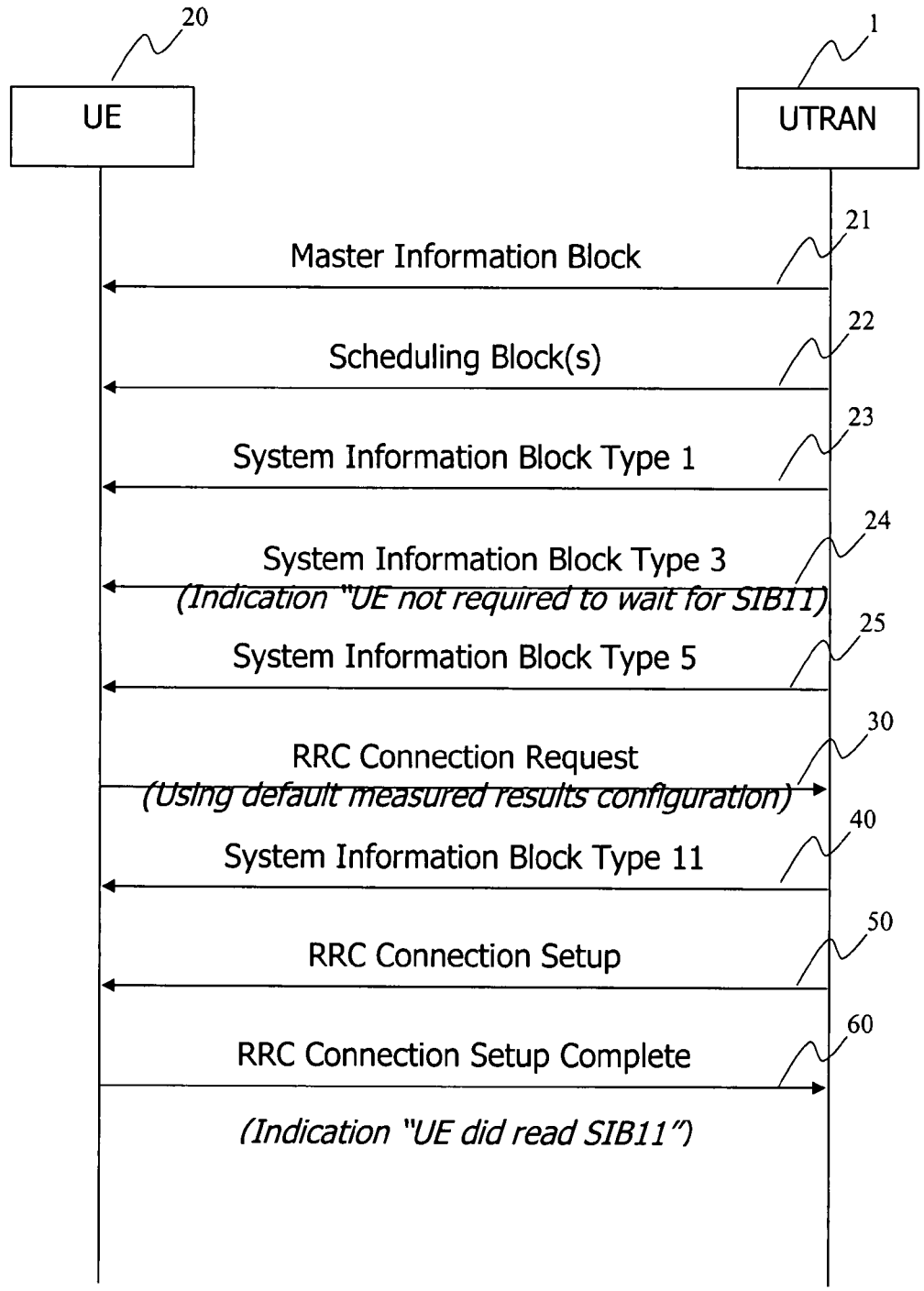
FIG. 2 shows a signalling diagram illustrating one embodiment of the present invention.

Thus as shown in FIG. 2, the user equipment 20 sends message 30 before it has received System Information Block Type 11 (labelled 40 in FIG. 2) from the UTRAN. In other embodiments, the user equipment may send message 30 after it has received the SIB11 message (40), but before it has processed message 40. The SIB11 message contains the required cell reporting configuration defined by the UTRAN.

In some embodiments of the present invention, the default cell reporting configuration defines that the user equipment reports the Received Signal Code Power of the serving cell (for setting the downlink power) and Ec/Io of any other measured cells. In a more specific embodiment, the user equipment may additionally report System Frame Number to System Frame Number (SFN-SFN) Observed Time Difference data for each of the other measured cells. In other embodiments, the user equipment may select and report cell results for only a sub-group of the measured cells, for instance only for a defined number of cells which are the strongest among the measured cells (e.g. having the strongest Received Signal Code Power or having the highest signal to interference ratio).

The RRC connection setup procedure then proceeds by UTRAN 1 sending RRC Connection Setup message 50 to the user equipment 20. The user equipment 20 responds by sending RRC Connection Setup Complete message 60 to the UTRAN.

The user equipment 20 may be configured in certain embodiments so that it defaults to sending an RRC Connection Request without waiting to receive any indication from the UTRAN that a particular cell reporting configuration is required. In other words, before starting a RACH access it is neither necessary that the user equipment receives the required reporting configuration from the UTRAN nor that the user equipment is informed by the UTRAN whether it must wait to receive the required reporting configuration.

In other embodiments, the user equipment is configured so that it determines, from earlier information broadcast from the UTRAN, whether it must wait to be notified of the required reporting configuration before sending an RRC Connection Request. For example, UTRAN 1 may send an indication to the user equipment that it can send message 30 before reading the SIB11 message. This indication may be included in one of the other system information blocks broadcast from the UTRAN 1, such as in System Information Block Type 3 (labelled 24 in FIG. 2).

The user equipment may include an indication in the RRC Connection Setup Complete message that it transmits to the UTRAN confirming that it has read the required reporting configuration defined by the UTRAN, for instance in the SIB11 message.

Figure 3:
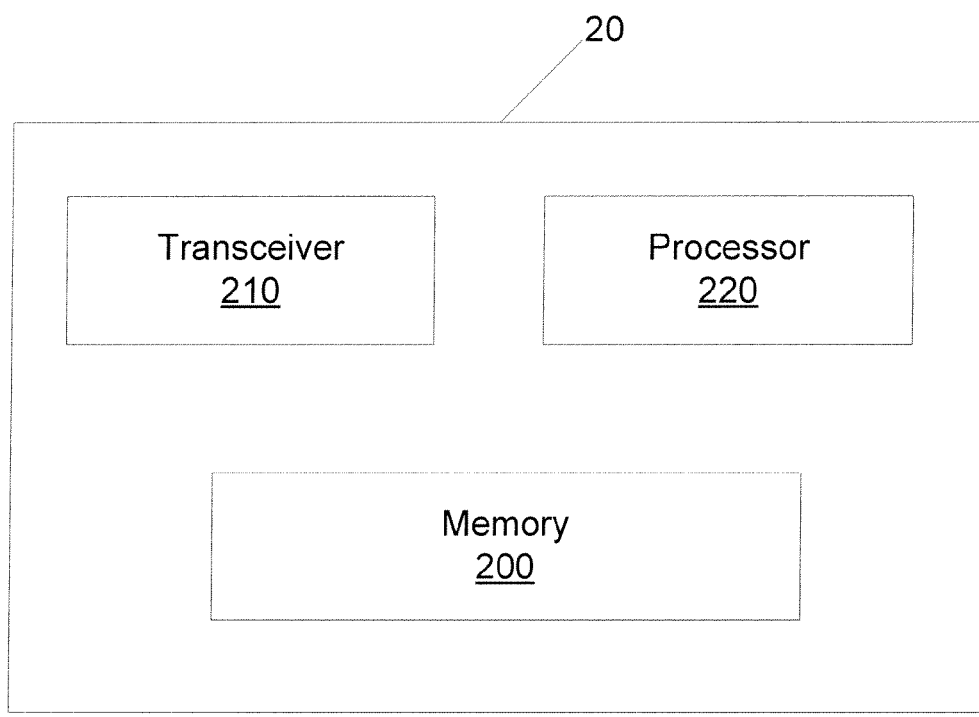
FIG. 3 shows a mobile terminal according to one embodiment of the invention.

As illustrated in the exemplary embodiment of FIG. 3, the mobile terminal or user equipment 20 may comprise a storage means such as a data memory 200. The storage means may be configured to store a suitably adapted computer program code product. User equipment 20 may further comprise a processing means, such as a processor 220. The user equipment may additionally comprise a transceiver means 210, comprising for example a transmitter and receiver. The computer program code product may be adapted such that when it is executed by the processor means it causes the user equipment to execute methods of embodiments of the present invention such as those described above.

The program code product may be stored on and provided by means of a carrier medium such as a carrier disc, card or tape. The program code product may be downloaded to the mobile device via a data network.

In other embodiments, the methods of the present invention may be implemented using dedicated hardware components instead of, or in addition to program code means. For instance, the mobile terminal may comprise one or more integrated circuits which operate to cause the mobile terminal to send the request for connection to the radio access network based on a default reporting configuration stored in the mobile terminal.

In a similar manner, elements and nodes in a radio access network such a NodeB or RNC may comprise corresponding storage, processor and/or transceiver means, and may be suitably configured by means of program code means to perform their respective operations in embodiments of the present invention. The nodes in the radio access network may also comprise dedicated hardware components such as integrated circuits adapted to cause these nodes to perform steps in embodiments of the present invention.

Although the present invention has been described above with respect to specific embodiments, it will be appreciated that a skilled person could perform the invention with various modifications therefrom. In particular, the embodiments above have been described herein with reference to a 3$^{rd}$ Generation (3G) UMTS communication system comprising a UTRAN. The invention is not limited, however, to such a system and may in alternative embodiments be implemented in other types of communication system.

Furthermore, a number of the specific examples relate to embodiments wherein the message which is sent by the mobile station on the common transport channel is a connection request message. As described above, the invention is not limited to such embodiments and in other embodiments the message may be any other type of message which is sent from a mobile station on a common transport channel, e.g. before a dedicated physical channel is established between the mobile station and the RAN. For instance, in one embodiment the message is a Cell Update message which is sent after the mobile terminal receives a Paging message in the CELL_PCH state.

We claim:
1. A method, comprising:
sending a radio resource control (RRC) message from a mobile terminal to a radio access network on a common transport channel,
wherein the radio resource control message comprises measurement information of one or more measurement results, each measurement result defining a value of a measured parameter relating to radio signal transmission between the mobile terminal and one or more access entities of the radio access network,
wherein the measurement information, which is sent to the radio access network via the radio resource control message, is based on a default reporting configuration stored in the mobile terminal, and
wherein the radio resource control message is sent without waiting to read any control message, from the radio access network, that indicates a required reporting configuration for reporting the information during a connection initiation procedure.

2. A method according to claim 1, wherein the measured parameter comprises received signal code power, a signal to interference ratio, or observed time difference.

3. A method according to claim 1, wherein the measured parameter relates to at least one of a first access entity serving the mobile terminal and one or more further access entities adjacent to the first access entity.

4. A method according to claim 1, wherein the information comprises a first measured value of received signal code power relating to the serving access entity.

5. A method according to claim 1, wherein the information further comprises at least one further measured value of received signal code power, the further measured values relating to one or more access entities adjacent to the first access entity.

6. A method according to claim 1, wherein the information further comprises one or more further measured values of Ec/No, each further measured value relating to an access entity adjacent to the first access entity.

7. A method according to claim 1, wherein the information further comprises one or more further measured values of SFN-SFN observed time difference type 1, each further measured value relating to an access entity adjacent to the first access entity.

8. A method according to claim 1, wherein the sending comprises sending the message before the mobile terminal reads a control message transmitted from the radio access network to the mobile terminal, the control message defining a required reporting configuration for reporting the information associated with one or more access entities from the mobile terminal to the radio access network.

9. A method according to claim 8, wherein the sending comprises sending the message before the mobile terminal receives the control message from the radio access network.

10. A method according to claim 8, wherein the control message comprises a system information block type 11.

11. A method according to claim 1, wherein the radio access network comprises a universal mobile telecommunications system terrestrial radio access network (UTRAN).

12. A method according to claim 1, wherein the sending comprises sending the message using a random access channel.

13. A method according to claim 1, wherein the message comprises a request for connection to the radio access network, a core network message, a measurement report message, or a location update message.

14. A method according to claim 1, wherein the sending comprises sending the message before establishment of a dedicated physical transport channel between the mobile terminal and the radio access network.

15. An apparatus, comprising:
at least one processor; and
at least one memory including computer program code,
the at least one memory and the computer program code configured, with the at least one processor, to cause the apparatus at least to
send a radio resource control (RRC) message to a radio access network on a common transport channel,
wherein the radio resource control message comprises measurement information of one or more measurement results, each measurement result defining a value of a measured parameter relating to radio signal transmission between the apparatus and one or more access entities of the radio access network,
wherein the measurement information, which is sent to the radio access network via the radio resource control message, is based on a default reporting configuration stored in the mobile terminal, and
wherein the radio resource control message is sent without waiting to read any control message, from the radio access network, that indicates a required reporting configuration for reporting the information during a connection initiation procedure.

16. The apparatus according to claim 15, wherein the at least one memory and the computer program code are further configured, with the at least one processor, to cause the apparatus to
measure one or more parameters, each parameter relating to radio signal transmission between the mobile terminal and an access entity, and wherein the information comprises one or more results of the measurements.

17. The apparatus according to claim 15, wherein the at least one memory and the computer program code are further configured, with the at least one processor, to cause the apparatus to send the message before reading a control message transmitted from the radio access network, the control message defining a required reporting configuration for reporting the information associated with one or more access entities from the apparatus to the radio access network.

18. An apparatus, comprising:
at least one processor; and
at least one memory including computer program code,
the at least one memory and the computer program code configured, with the at least one processor, to cause the apparatus at least to
receive and process, without first sending any control message, a radio resource control (RRC) message from a mobile terminal on a common transport channel of a radio access network,
wherein the radio resource control message comprises information of one or more measurement results, each measurement result being received at the radio access network via the radio resource control message and defining a value of a measured parameter relating to radio signal transmission between the mobile terminal and one or more access entities of the radio access network,
the information being based on a default reporting configuration stored in the mobile terminal without the mobile terminal waiting to read any control message that indicates a required reporting configuration for reporting the information during a connection initiation procedure.

19. The apparatus according to claim 18, wherein the at least one memory and the computer program code are further configured, with the at least one processor, to cause the apparatus to send a control message to the mobile terminal after the mobile terminal transmits the message, the control message defining a required reporting configuration for reporting the information associated with one or more access entities from the mobile terminal to the radio access network.

20. A system, comprising:
a mobile terminal configured to
send a radio resource control (RRC) message to a radio access network on a common transport channel,
wherein the resource control message comprises information of one or more measurement results, each measurement result defining a value of a measured parameter relating to radio signal transmission between the mobile terminal and one or more access entities of the radio access network,
the mobile terminal being configured to send the measurement information to the radio access network via the radio resource control message based on a default reporting configuration stored in the mobile terminal without the mobile terminal waiting to read any control message from the radio access network, from the radio access network, that indicates a required reporting configuration for reporting the information during a connection initiation procedure; and
a node in the radio access network configured to receive and process the message.

21. A computer program embodied on a non-transitory computer readable medium, wherein the computer program, when executed by a processor in a mobile terminal, causes the mobile terminal to:
send a radio resource control (RRC) message to a radio access network on a common transport channel,
wherein the radio resource control message comprises information of one or more measurement results, each measurement result defining a value of a measured parameter relating to radio signal transmission between the mobile terminal and one or more access entities of the radio access network,
wherein the measurement information, which is sent to the radio access network via the radio resource control message, is based on a default reporting configuration stored in the mobile terminal, and
wherein the radio resource control message is sent without waiting to read any control message, from the radio access network, that indicates a required reporting configuration for reporting the information during a connection initiation procedure.

22. An apparatus, comprising:
storage means for storing a default reporting configuration defining at least one type of information to be sent to a radio access network via a radio resource control message, the information comprising at least one measurement result, each measurement result defining a value of a measured parameter relating to radio signal transmission between a mobile terminal and one or more access entities of the radio access network; and
transmission means for sending the radio resource control (RRC) message to the radio access network on a common transport channel, the radio resource control message comprising information of the type defined in the default reporting configuration, without waiting to read any control message, from the radio access network, that indicates a required reporting configuration for reporting the information during a connection initiation procedure.

23. The apparatus according to claim 15, wherein the apparatus comprises an integrated circuit.

* * * * *